(12) United States Patent
Larmande

(10) Patent No.: US 6,782,981 B2
(45) Date of Patent: Aug. 31, 2004

(54) ANTIVIBRATION APPARATUS INCLUDING A MASS DAMPER

(75) Inventor: Franck Larmande, Grand Rapids, MI (US)

(73) Assignee: Paulstra CRC, Grand Rapids, MI (US)

( * ) Notice: Subject to any disclaimer, the term of this patent is extended or adjusted under 35 U.S.C. 154(b) by 0 days.

(21) Appl. No.: 10/335,436

(22) Filed: Dec. 30, 2002

(65) Prior Publication Data

US 2004/0124052 A1 Jul. 1, 2004

(51) Int. Cl.[7] .................................................. F16F 7/10
(52) U.S. Cl. ........................ 188/379; 267/293; 267/136
(58) Field of Search .............................. 188/378, 379, 188/380; 267/292, 293, 136

(56) References Cited

U.S. PATENT DOCUMENTS

| | | | |
|---|---|---|---|
| 4,641,732 A | * | 2/1987 | Andry ........................ 188/379 |
| 4,744,547 A | * | 5/1988 | Hartel ........................ 267/141 |
| 5,366,210 A | * | 11/1994 | Grunau et al. ........... 267/140.4 |
| 5,433,422 A | * | 7/1995 | Ross et al. ............. 267/140.15 |
| 5,444,195 A | * | 8/1995 | Dojo ........................ 181/208 |

FOREIGN PATENT DOCUMENTS

| | | | |
|---|---|---|---|
| JP | 1030678 | * | 2/1998 |
| JP | 11166570 | * | 6/1999 |

* cited by examiner

*Primary Examiner*—Robert A. Siconlei
*Assistant Examiner*—Devon Kramer
(74) *Attorney, Agent, or Firm*—Marshall, Gerstein & Borun LLP

(57) ABSTRACT

An antivibration apparatus for limiting vibrations of a vibrating element, comprising a mass, two elastic members connected to the mass, and a support member including a metal sheet plate having a central portion and two lateral wings, the lateral wings being fixed respectively to the elastic members and converging slantwise toward the central portion, away from the mass, and the central portion being adapted to be fixed to the vibrating element.

6 Claims, 3 Drawing Sheets

FIG.3
(PRIOR ART)
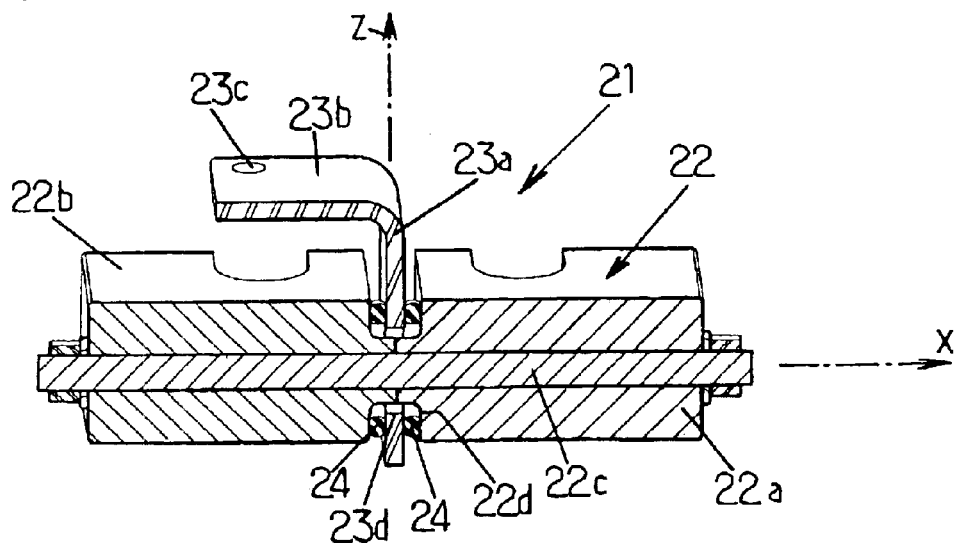
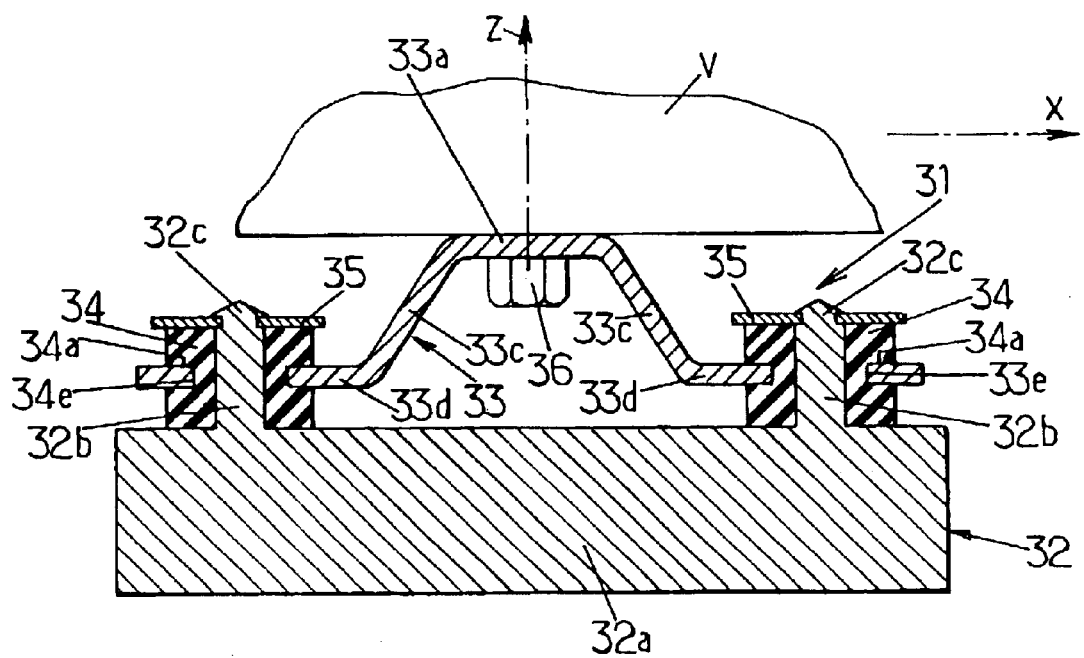
FIG.4.

ANTIVIBRATION APPARATUS INCLUDING A MASS DAMPER

FIELD OF THE INVENTION

The invention relates to antivibration apparatuses including mass dampers.

BACKGROUND OF THE INVENTION

More precisely, the invention relates to an antivibration apparatus for limiting vibrations of a vibrating element, said antivibration apparatus including a support which is designed to be fixed to the vibrating element, a mass and at least one elastic connection member linking the mass to the support.

Such antivibration apparatuses are known in the art. For instance, as shown in FIG. 1 of the drawings, one known antivibration apparatus 1 of this type includes a mass 2, constituted for instance by two mass bodies 2a, 2b which are held together by a through-going bolt 2c extending parallel to a horizontal axis X.

The two mass bodies 2a, 2b delimit between themselves a groove 2d which extends around axis X and in which penetrates a support member 3 which is designed to be fixed to a vibrating element such as a vehicle body or frame, a portion of a powertrain, etc.

The support member 3 is constituted by a vertical metal plate, extending parallel to a vertical axis Z and to a horizontal axis Y perpendicular to said axis X. This vertical plate 3 includes a hole 3a which is traversed by the bolt 2c and by a portion of smaller diameter belonging to the mass bodies 2a, 2b, and said vertical plate 3 is connected to the mass 2a by two elastomer rings 4 which are disposed around the hole 3a and which are interposed respectively between the plate 3 and the mass bodies 2a, 2b parallel to axis X, inside the groove 2d.

The antivibration apparatus of FIG. 1 has the drawback of being rather bulky, especially in the vertical direction.

The known antivibration apparatus of FIG. 2 has a mass 12 including a mass body 12a and a stem 12b which extends vertically upward, parallel to axis Z, up to a centering pin 12c of smaller diameter.

The antivibration device of FIG. 2 further includes a support member 13, in the form of a metal sheet plate. This support member 13 has:

a central flat portion 13a which extends horizontally parallel to axis X, Y, and two lateral wings 13c, 13d which diverge from the central portion in opposite direction, parallel to axis X.

The central portion 13a of the support member includes a hole 13b which is traversed by the stem 12b of the mass 12, so that the central portion 13a of the support member is close to the mass body 12a, while each wing includes an intermediate portion 13c which extends slantwise away from the mass body 12a parallel to axis Z and away from the central portion 13a parallel to axis X. Each intermediate portion 13c of the support member is extended outward by an end portion 13d which extends horizontally parallel to the central portion 13a and which includes a hole 13e for fixing the support member to a vibrating element.

The support member 13 is connected to the weight 12 by an elastomer bushing 14 which is engaged around the stem 12b of the mass and which includes an annular groove 14a in which penetrates the part of the central portion 13a surrounding the hole 13b.

The elastomer bushing 14 is maintained around the stem 12b, firstly by abutment against the mass member 12a, and secondly by abutment against a washer 15 which is fixed to the stem 12b by crimping of the pin 12c.

The antivibration apparatus of FIG. 2 has the drawback of requiring a rather large space available for fixing the support member by its two end portions 13d. Further, this apparatus may lack stability and may enter into unsuitable vibration in rotation around axis Y, which may transmit additional vibration to the vibrating element instead of decreasing the level of vibration.

The known antivibration apparatus of FIG. 3 has a mass 22 which includes two mass bodies 22a, 22b connected together by a bolt 22c or similar, extending parallel to a horizontal axis X.

The two mass bodies 22a, 22b delimit therebetween a groove 22d extending around the bolt 22c and around two portions of smaller transversal dimensions belonging to the two mass bodies 22a, 22b.

The support member 23 in the form of a L-shaped metal plate, includes a vertical plate 23a and a horizontal fixing portion 23b having a hole 23c for fixing the support member to a vibrating element. The vertical plate 23a extends perpendicular to axis X et penetrates in the groove 22d, said vertical plate having a hole 23d which is traversed by the bolt 22c and the thinner portions of the mass bodies 22a, 22b.

The vertical plate 23a of the support member is connected to the mass 22 by two elastomer rings 24 which are disposed around the hole 23d and which are interposed respectively between the plate 23a and the two mass bodies 22a, 22b in the direction of axis X.

The antivibration apparatus of FIG. 3 has substantially the same drawbacks as that of FIG. 1.

OBJECTS AND SUMMARY OF THE INVENTION

One objective of the present invention is to remedy these drawbacks, for a cost as limited as possible.

To this end, according to the invention, an antivibration apparatus of the type in question includes:

a mass, two elastic members connected to said mass, a support member including a metal sheet plate having a central portion and two lateral wings, said lateral wings being fixed respectively to said elastic members and converging at least partially slantwise toward the central portion, away from the mass at least along a central axis which is perpendicular to the central portion, and said central portion being adapted to be fixed to the vibrating element.

In various embodiments of the invention, one may possibly have recourse in addition to one and/or other of the following arrangements:

each of the two lateral wings includes an intermediate portion extending slantwise relative to the central portion of the support member, and an end portion extending substantially parallel to said central portion;

the central portion of the support member is flat, and the end portions of the lateral wings are flat and parallel to the central portion;

the mass includes a mass body and two stems which extend parallel to said central axis and traverse two holes provided respectively in the two lateral wings of the support member, said elastic members including two elastomer bushings which are fitted around the stems of the mass, each elastomer bushing including an annular external groove which is fitted on the corresponding lateral wing of the support member around the hole of said lateral wing;

the elastomer bushing is fixed to the corresponding stem of the mass by abutment, parallel to said central axis, against the mass body and against a washer which is fixed to said corresponding stem;

the washer is fixed to said corresponding stem by crimping;

the central portion of the support member includes two holes which are adapted to receive fixing members, and the mass body includes two cutout portions which traverse said mass body parallel to the central axis in correspondence with the holes of said central portion of the support member.

BRIEF DESCRIPTION OF THE DRAWINGS

Other characteristics and advantages of the invention appear from the following detailed description of one of its embodiments, given by way of non-limiting example, and with reference to the accompanying drawings.

In the drawings:

FIGS. 1–3 illustrate three antivibration apparatuses of the prior art;

FIG. 4 is a vertical section of an antivibration apparatus according to one embodiment of the invention, mounted in a vehicle;

In the figures, the same references denote identical or similar elements.

The antivibration apparatus according to the invention is used for limiting vibrations of a vibrating element excited for instance by a motor. Said vibrating element can be for instance a vehicle body or frame, a portion of the powertrain of a vehicle, etc.

Figure 1:
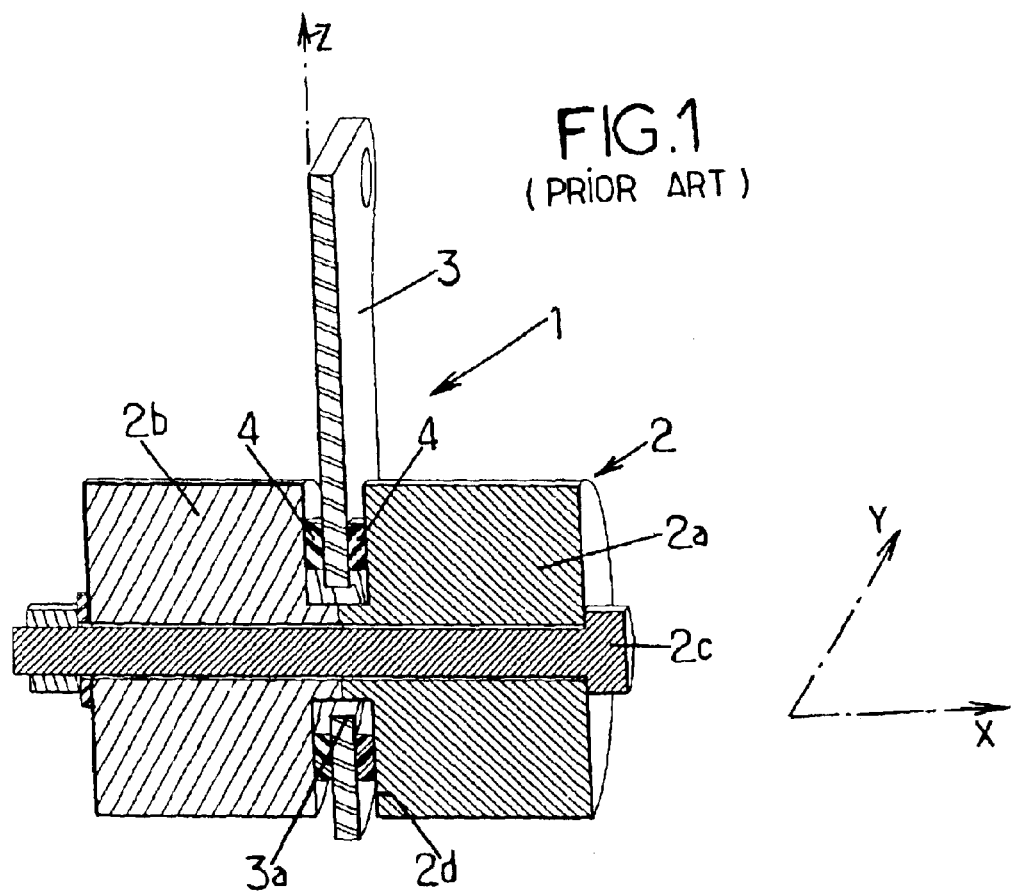
Figure 2:
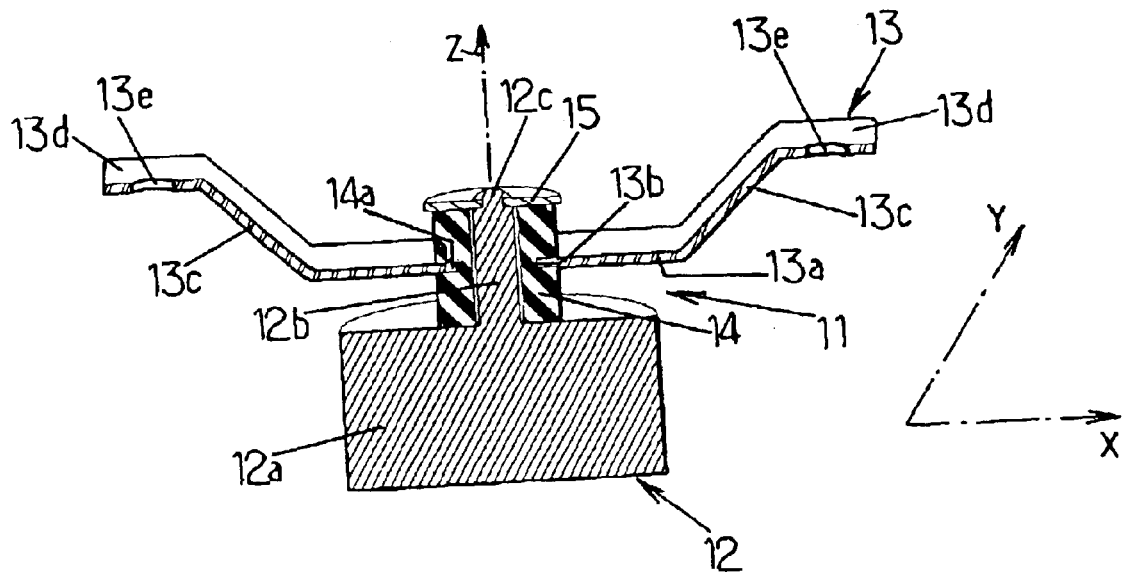
Figure 5:
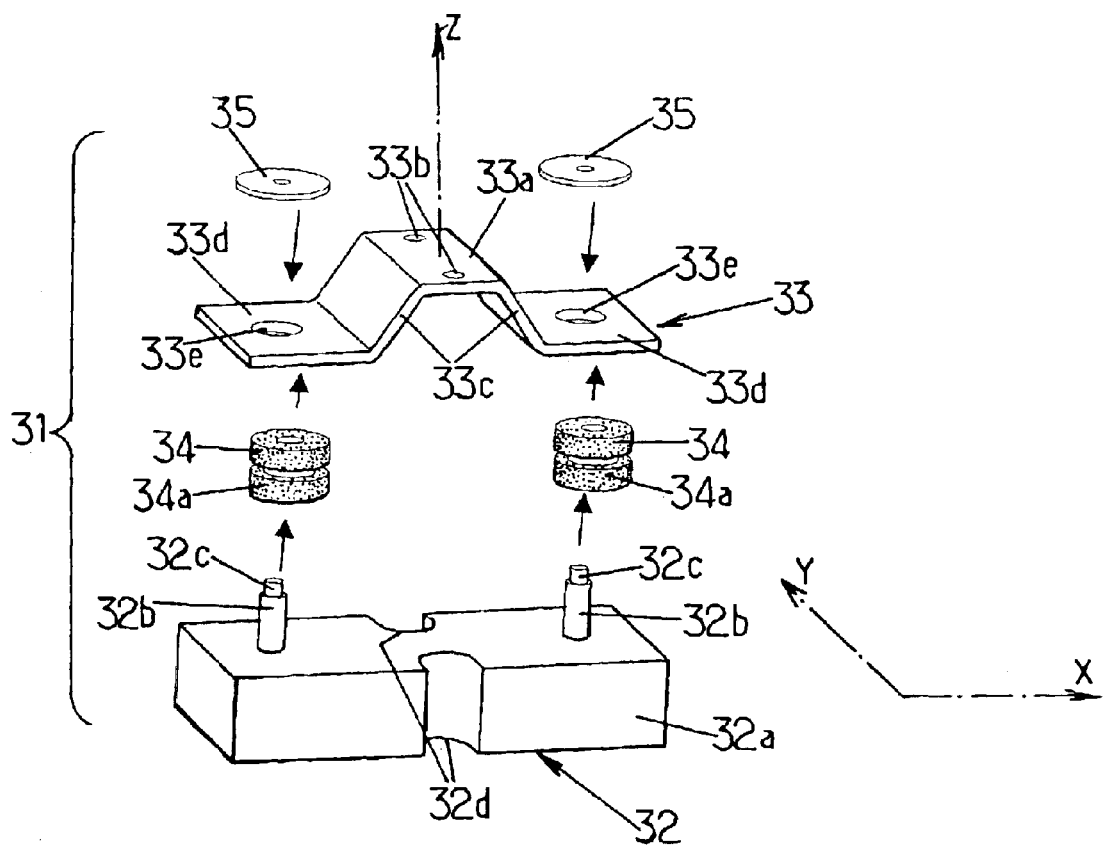
FIG. 5 is an exploded view of the apparatus of FIG. 4 before it is assembled.

As shown in FIGS. 4 and 5, the antivibration apparatus 31 according to the invention has a mass 32 constituted for instance by a single piece of steel or other metal. The mass 32 includes a mass body 32a which may have for instance a substantially parallelepipedic general shape. The mass body 32a may extend longitudinally parallel to a horizontal axis X and transversely parallel to a second horizontal axis Y which is perpendicular to axis X. The width of the mass body 32a parallel to axis Y is lower than the length of said mass body 32a parallel to axis X, and the height of the mass body 32a parallel to a vertical axis Z is advantageously relatively small and preferably smaller than the dimensions of mass body 32a along axes X and Y, so that said mass body has a substantially flat horizontal shape.

The mass 32 further includes two stems 32b which are rigid with mass body 32a and which are situated near the two ends of mass body 32a along axis X. Each stem 32b extends vertically upward, parallel to axis Z, up to a centering pin 32c of smaller diameter as the stem 32b.

The antivibration apparatus 31 further includes a support member 33, in the form of a metal sheet plate having a substantially rectangular general shape which may substantially correspond to the shape of the mass body 32a in the horizontal plane.

The support member 33 includes a central portion 33a and two lateral wings which are fixed respectively to elastic members 34, said elastic members 34 being themselves fixed to the stems 32b of the mass 32. The two lateral wings 33c, 33d converge, at least partially slantwise, toward the central portion 33a, away from the mass body 32a at least along the central axis Z.

More precisely, the central portion 33a of the support member may be for instance a flat portion which extends horizontally parallel to axes X, Y and may include for instance two lateral holes 33b situated near the edges of the support member 33 which are parallel to axis X. The holes 33b of the central portion 33a are adapted to receive fixing members such as screws or similar members, in order to fix the central portion 33a to the vibrating element V.

Advantageously, the mass body 32a includes two cutout portions 32d forming vertical wells which are in correspondence with the holes 33b, to enable the screwing of screws in holes 33b.

The lateral wings of the support member may for instance include two intermediate portions 33c which extend slantwise relative to axes X, Z, in opposite directions and toward the mass body 32a from the central portion 33a, up to two respective end portions 33d.

Each end portion 33d may be a flat portion extending horizontally parallel to axes X, Y and including a hole 33e.

The elastic members 34 may be for instance two elastomer bushings which are fitted without play around the stems 32b and each of which include an annular horizontal external groove 34a. This grove may be snap fitted on the corresponding lateral wing of the support member, around the hole 33e of the corresponding end portion 33d of the support member. This snap fitting is preferably carried out by inserting the bushings 34 in the holes 33e before fitting the bushings 34 on the stems 32b.

Each elastomer bushing 34 may be fixed to the corresponding stem 32b by abutment, parallel to axis Z, against the mass body 32a and against a rigid washer 35 which is engaged without play on the corresponding pin 12c after fitting the bushing 34 on the stem 32b. The washer 35 may be fixed to the pin in any known way, for instance by crimping of the pin 32c.

The antivibration apparatus which has been described above has the advantage of being simple, cheap, compact and stable when submitted to vibrations.

When the vibrating element V is submitted to vibrations, the amplitude of these vibrations is decreased by the antivibration apparatus 31 in predetermined ranges of frequencies depending on the weight of the mass 32 and on the stiffness of the elastomer bushings 34, as already known in the art.

I claim:

1. An antivibration apparatus for limiting vibrations of a vibrating element, said antivibration apparatus including:
   a mass,
   two elastic members connected to said mass, and
   a support member including a metal sheet plate having a central portion and two lateral wings, said lateral wings being fixed respectively to said elastic members and converging at least partially slantwise toward the central portion, away from the mass at least along a central axis which is perpendicular to the central portion, and said central portion being adapted to be fixed to the vibrating element;
   wherein the mass includes a mass body and two stems which extend parallel to said central axis and traverse two holes provided respectively in the two lateral wings of the support member, said elastic members including two elastomer bushings which are fitted around the stems of the mass, each elastomer bushing including an annular external groove which is fitted on the corresponding lateral wing of the support member around the hole of said lateral wing.

2. An antivibration apparatus according to claim 1, wherein each of the two lateral wings includes an intermediate portion extending slantwise relative to the central portion of the support member, and an end portion extending substantially parallel to said central portion.

3. An antivibration apparatus according to claim 2, wherein the central portion of the support member is flat, and the end portions of the lateral wings are flat and parallel to the central portion.

4. An antivibration apparatus according to claim 1, wherein the elastomer bushing is fixed to the corresponding stem of the mass by abutment, parallel to said central axis, against the mass body and against a washer which is fixed to said corresponding stem.

5. An antivibration apparatus according to claim 4, wherein the washer is fixed to said corresponding stem by crimping.

6. An antivibration apparatus for limiting vibrations of a vibrating element, said antivibration apparatus including:

a mass, two elastic members connected to said mass, and a support member including a metal sheet plate having a central portion and two lateral wings, said lateral wings being fixed respectively to said elastic members and converging at least partially slantwise toward the central portion, away from the mass at least along a central axis which is perpendicular to the central portion, and said central portion being adapted to be fixed to the vibrating element;

wherein the central portion of the support member includes two holes which are adapted to receive fixing members, and the mass body includes two cutout portions which traverse said mass body parallel to the central axis in correspondence with the holes of said central portion of the support member.

* * * * *